(12) United States Patent
Willmott

(10) Patent No.: US 11,168,724 B2
(45) Date of Patent: Nov. 9, 2021

(54) TOGGLE AND ASSEMBLY OF TOGGLE AND SUPPORT MEMBER

(71) Applicant: KEE SAFETY LIMITED, West Midlands (GB)

(72) Inventor: Graham Willmott, Surrey (GB)

(73) Assignee: KEE SAFETY LIMITED, West Midlands (GB)

( * ) Notice: Subject to any disclaimer, the term of this patent is extended or adjusted under 35 U.S.C. 154(b) by 0 days.

(21) Appl. No.: 16/310,696

(22) PCT Filed: Jun. 14, 2017

(86) PCT No.: PCT/GB2017/000091
§ 371 (c)(1),
(2) Date: Dec. 17, 2018

(87) PCT Pub. No.: WO2017/216509
PCT Pub. Date: Dec. 21, 2017

(65) Prior Publication Data
US 2019/0178279 A1  Jun. 13, 2019

(30) Foreign Application Priority Data

Jun. 17, 2016 (GB) .................................... 1610570
Jul. 29, 2016 (GB) .................................... 1613161

(51) Int. Cl.
*A62B 35/00* (2006.01)
*E04D 13/12* (2006.01)
(Continued)

(52) U.S. Cl.
CPC ...... *F16B 13/0808* (2013.01); *A62B 35/0068* (2013.01); *E04G 21/328* (2013.01);
(Continued)

(58) Field of Classification Search
CPC .. F16B 13/0808; F16B 2013/105; F16B 2/02; A62B 35/0068; E04G 21/32
(Continued)

(56) References Cited

U.S. PATENT DOCUMENTS

| 5,197,567 | A | 3/1993 | Rabalais |
| 6,779,316 | B2 * | 8/2004 | Carroll ................ E04G 21/3261 411/340 |

(Continued)

FOREIGN PATENT DOCUMENTS

| DE | 20 2006 016678 U1 | 12/2006 |
| DE | 102007039966 A1 | 5/2008 |

(Continued)

OTHER PUBLICATIONS

International Search Report, dated Sep. 22, 2017, from corresponding PCT/GB2017/000091 application.
(Continued)

*Primary Examiner* — Tan Le
(74) *Attorney, Agent, or Firm* — Nixon & Vanderhye

(57) ABSTRACT

A toggle includes a bearer plate which defines a surface for bearing, in use, against the confronting surface of a support structure and a pair of support plates secured to the bearer plate and spaced apart to pivotally support there between a barrel, the barrel being integral with or connectable to a connector whereby, in use, the connector may secure the toggle bearer plate against the confronting surface of a support structure, at least the bearer plate of the toggle being formed from mild steel. There is provided also an assembly of the toggle and a support member, with the connector extending through the support member to secure the bearer plate against a confronting surface of the support member.

21 Claims, 5 Drawing Sheets

(51) Int. Cl.
*F16B 13/08* (2006.01)
*F24S 25/61* (2018.01)
*E04G 21/32* (2006.01)
*F16B 2/02* (2006.01)

(52) U.S. Cl.
CPC ............ *E04G 21/3295* (2013.01); *F16B 2/02* (2013.01); *F24S 25/61* (2018.05)

(58) Field of Classification Search
USPC ........................................................ 248/237
See application file for complete search history.

(56) References Cited

U.S. PATENT DOCUMENTS

| | | | | |
|---|---|---|---|---|
| 7,077,373 | B1 * | 7/2006 | Hoebener | F16M 11/10 |
| | | | | 248/278.1 |
| 8,708,099 | B2 * | 4/2014 | Fortin | E04G 21/3295 |
| | | | | 182/3 |
| 9,004,457 | B2 * | 4/2015 | Carl | E01D 19/02 |
| | | | | 256/65.14 |
| 2008/0041662 | A1 | 2/2008 | Despres | |
| 2010/0012427 | A1 | 1/2010 | Julliard | |

FOREIGN PATENT DOCUMENTS

| | | |
|---|---|---|
| EP | 2 687 267 A1 | 1/2014 |
| EP | 2 868 840 A1 | 5/2015 |
| GB | 5 440 88 A | 1/1941 |
| GB | 9 921 79 A | 3/1963 |
| GB | 1 152 070 A | 12/1966 |
| GB | 1 152 070 A | 5/1969 |
| GB | 2 547 060 A | 8/2017 |
| JP | 2006144414 A | 6/2006 |

OTHER PUBLICATIONS

GB Search Report, dated Jan. 24, 2017, from corresponding GB1613161.7 application.
Irish Search Report, dated Jul. 4, 2018, from corresponding 2017/0135 application.

* cited by examiner

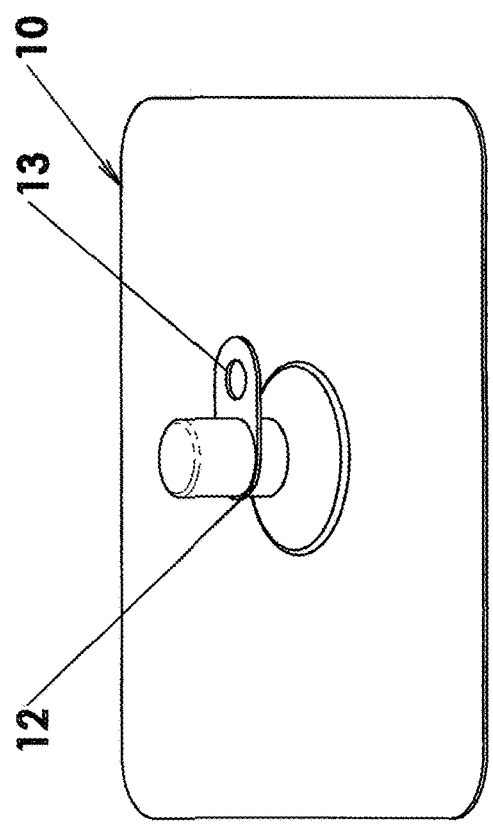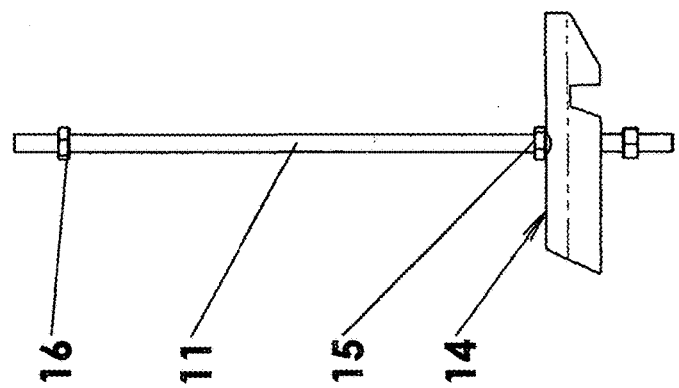
FIG. 1

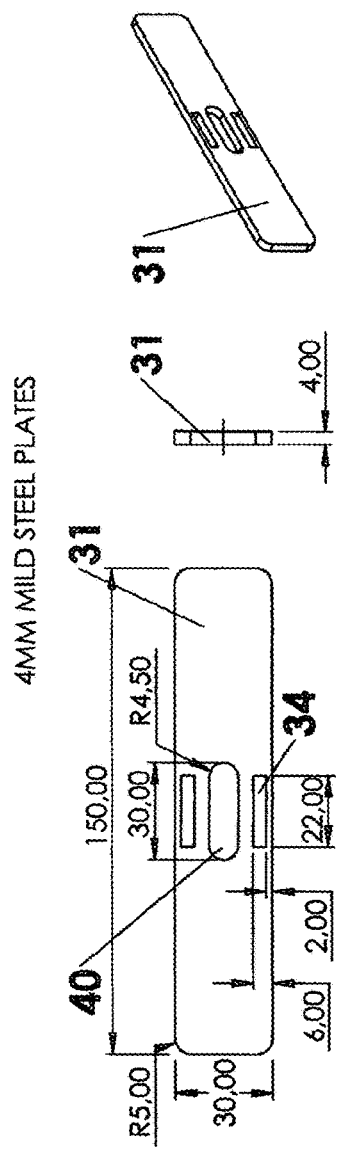
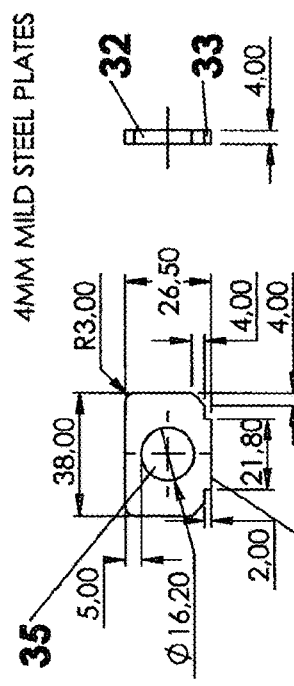
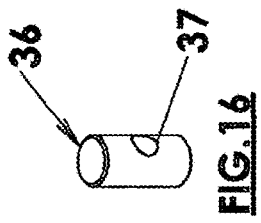
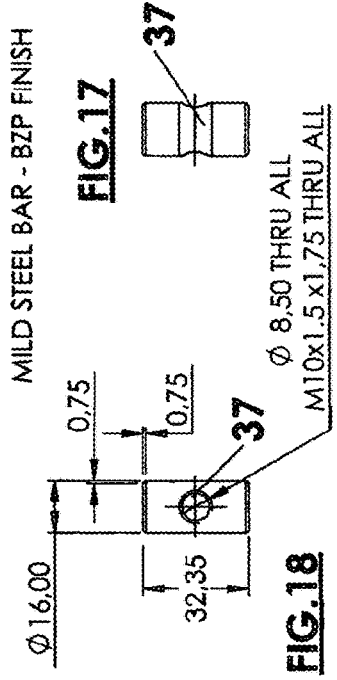

| ITEM No. | DESCRIPTION | QTY. |
|---|---|---|
| 1 | WEATHER CAP | 1 |
| 2 | TOP FIX POST | 1 |
| 3 | M12 x 300.00 HEX HEAD | 4 |
| 4 | TOP HAT FIXING | 4 |
| 5 | TOGGLE | 4 |
| 6 | BARREL | 4 |

TOGGLE AND ASSEMBLY OF TOGGLE AND SUPPORT MEMBER

This invention relates to an improved toggle and in particular, though not exclusively, to an improved toggle for securing a support member, such as a component of a fall arrest system, to a roof structure. It relates in particular, though not exclusively, to a toggle for use with standing seam and metal profile type roofs. It relates also to the assembly of a toggle and a support member.

BACKGROUND OF THE INVENTION

It is well known that for a roof top safety installation there may be provided a support member, such as for safety railing or a fall arrest wire, and that that support member may be held in position by means of a retainer comprising, for example, a screw threaded rod which extends through the roof between the support member and a toggle that bears in the assembled condition against the underside of the roof structure thereby to clamp the support member in position on the roof top.

One example of a commonly employed form of installation is that shown at FIG. 1 of the accompanying drawings. This shows an anchor plate 10 for resting on the surface of a roof structure and on top of which there is positioned an attachment 12 comprising an aperture 13 which may be employed for attachment of a safety wire. The attachment 12 is clamped in position by means of a screw-threaded rod 11 which engages with a screw threaded internal bore of the attachment 12 to extend through an aperture in the roof structure. A lower end 15 of the rod 11 has pivotally secured thereto a toggle 14 which can lie in a first pivot position alongside the screw threaded rod to allow the rod and toggle to be inserted through an aperture in the roof structure. Subsequently, following insertion, the toggle adopts a substantially horizontal position as illustrated. Clamping of the toggle against the roof structure, and thus also clamping of the attachment 12 to the roof structure is then effected by rotation of the attachment to draw the upper end 16 of the screw threaded rod further into the attachment.

Although a toggle and installation assembly as aforedescribed may be suitable for some applications, it does not meet recognised safety standards such as that of EN 795 Type C and relating to support members that are to be employed as part of a fall arrest system.

A particular problem that has been encountered is that of ensuring that not only does the toggle possess sufficient strength to withstand the forces applied during testing or subsequent use, but also of ensuring that the toggle does not damage the roof structure, particularly when the toggle is subjected to load, to such an extent that the strength and integrity of the roof structure is dangerously compromised.

Consideration has been given to use of an array of toggles, typically four toggles, each for securing in position under a respective corner of a mounting plate, as shown in FIG. 19. However, whilst that results in a reduction in the load that each toggle needs to withstand, and thus the potential damage which each toggle might inflict on the roof structure, that does not necessarily significantly reduce the load which each toggle and toggle position might experience. In the case of a load applied vertically upwards to a support member it is likely that that applied load would be shared substantially equally between each of a plurality of toggles. However if a sideways load is applied, for example to a support post extending upwards from or part of the support member and which might then tend to cause tilting of the support member, not all of the toggles will provide significant resistance to that tilting movement. Thus there remains a difficulty in ensuring that each toggle itself is sufficiently strong and also does not significantly damage and weaken the roof structure when resisting an applied load.

SUMMARY OF THE INVENTION

The present invention teaches that provision of a toggle comprising a bearer plate which defines a surface for bearing, in use, against the confronting surface of a support structure and a pair of support plates secured to the bearer plate and spaced apart pivotally to support therebetween a barrel, said barrel being integral with or connectable to a connector whereby, in use, the connector may secure the toggle bearer plate against the confronting surface of a support structure, at least the bearer plate of the toggle being formed from mild steel.

The barrel may be provided with a screw threaded aperture into which an end of a screw threaded connector may extend. The screw treaded aperture may be a blind bore or may extend fully through the barrel.

Preferably the barrel support plates are formed from mild steel. Preferably the support plates are secured the bearer plate by welding, including for example by means of a puddle type weld.

The pivotable barrel may be formed from mild steel.

At least for the purpose of providing a toggle which enables a mounting assembly to comply with the requirements of the aforementioned standards, the bearer plate preferably has a thickness in the range 3 mm to 5 mm. A thickness of 4 mm has been found to be particularly beneficial in providing a bearer plate that when subject to load is able to deform in a manner which is sympathetic to deformation of the surface against which it bears, particularly against the underside surface of a standing seam or metal profile type roof, without puncturing or otherwise substantially weakening the roof whereby the roof itself ceases to be able properly to retain the support member.

The or each support plate preferably has a thickness in the range 3 mm to 5 mm.

Preferably each barrel support plate comprises a tongue portion which extends into a respective one of a pair of slots provided in the bearer plate. The tongue portion may be inserted into a respective slot prior to the barrel support plate being welded to the bearer plate.

A typical dimension for the bearer plate is 150 mm length and 30 mm width. In consequence when employing barrel support plates which are of a thickness of 4 mm, and set 2 mm inwards from an edge of the bearer plate, the barrel support plates define therebetween a spacing of 18 mm thereby to locate a barrel and accommodate a connector which extends through an aperture in the barrel or which is integral with the barrel.

Particularly if the connector rod extends fully through the barrel, and more particularly if it is a screw threaded connector rod, a slot may be provided in the bearer plate, to lie between the barrel support plates and define an opening through which the end of a (screw threaded) rod may extend as it is rotated relative to the bearer plate when the bearer plate lies substantially perpendicular to the rod, thereby in use to draw the bearer plate into contact with a confronting surface of, for example, a roof structure.

BRIEF DESCRIPTION OF THE DRAWINGS

One embodiment of the present invention will now be described, by way of example only, with reference to the accompanying drawings in which:—

FIG. 1 is a view of a commonly employed form of safety installation, with an anchor plate and a toggle;

FIGS. 10 to 12 are respectively perspective, plan and end views of the bearer plate of the toggle of FIG. 2;

FIGS. 13, 14 and 15 are respectively perspective, plan and end views of a bearer plate;

FIGS. 16, 17 and 18 are respectively perspective plan and side views of the barrel of FIG. 2;

DETAILED DESCRIPTION OF THE PREFERRED EMBODIMENTS

Figure 5:
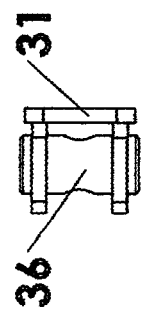
FIGS. 3, 4 and 5 are respectively plan, elevation and end views of the toggle of FIG. 2.
Figure 2:
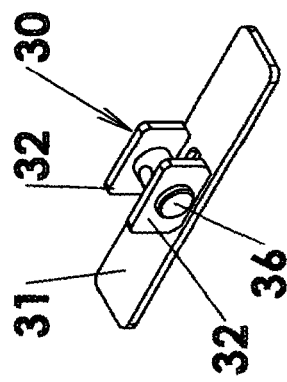
FIG. 2 is a perspective view of a toggle in accordance with the present invention.

A toggle 30 comprises a bearer plate 31 and a pair of barrel support plates 32 each formed from 4 mm thick mild steel. The support plates each comprise a tongue portion 33 that locates in a respective one of a pair slots 34 in the bearer plate whereby in the assembled condition the barrel support plates extend upwards from the bearer plate, perpendicular thereto and are spaced apart to define a space for accommodating the end of a screw threaded rod.

The bearer plate has a dimension of 150 mm by 30 mm and the support plates are each inset from longer edges of the bearer plate by 2 mm. In consequence the confronting surfaces of the support plates are spaced by 18 mm.

Each support plate is formed with an aperture 35 through which a barrel 36 extends and within which the barrel is freely pivotable. The barrel 36 is provided with a screw-threaded aperture 37 into which, in use, a screw threaded rod (not shown) extends. The diameter of the screw threaded rod is at least 8.5 m. In consequence, for a barrel of a length of at least 33 mm, the screw threaded rod thereby axially constrains movement of the barrel whereby it is retained in position and supported by each bearer plate.

Figure 3:
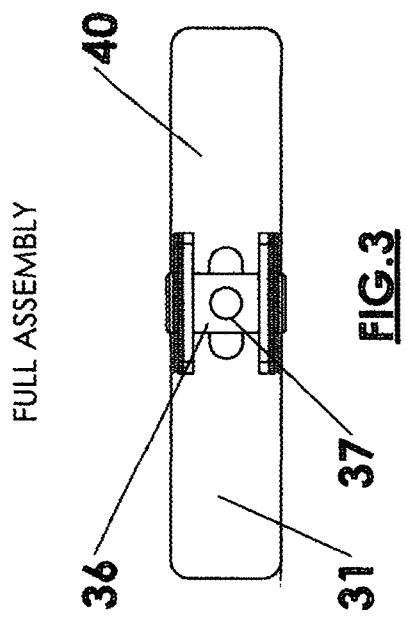
Figure 4:
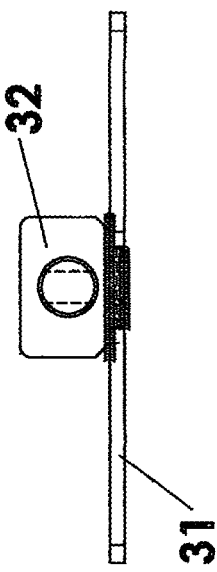
Figure 9:
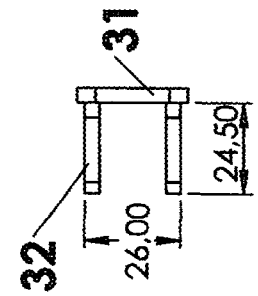
FIGS. 6 to 9 correspond with FIGS. 2 to 5 but for clarity omit the pivotable barrel.
Figure 6:
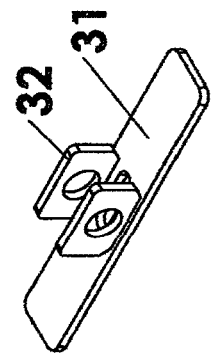
Figure 7:
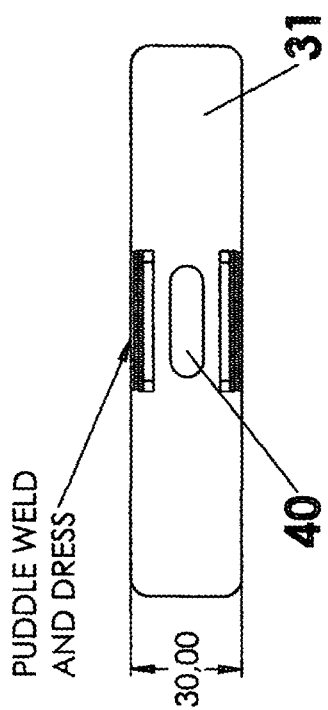
Figure 8:
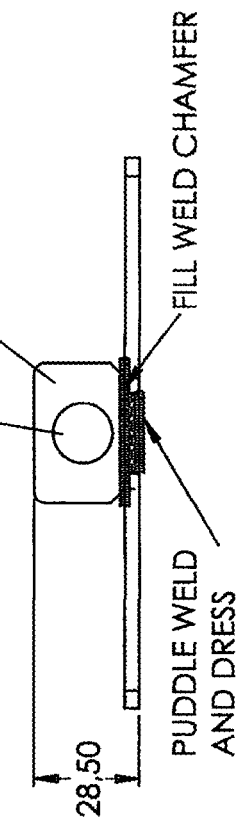

In known manner the bearer plate is provided with a central slot 40 whereby, when the bearer plate is perpendicular to the screw-threaded rod, with the barrel in the position shown in FIG. 3, the end of the rod may be screwed relative to the barrel such that the end of the rod then extends through the slot 40.

Figure 19:
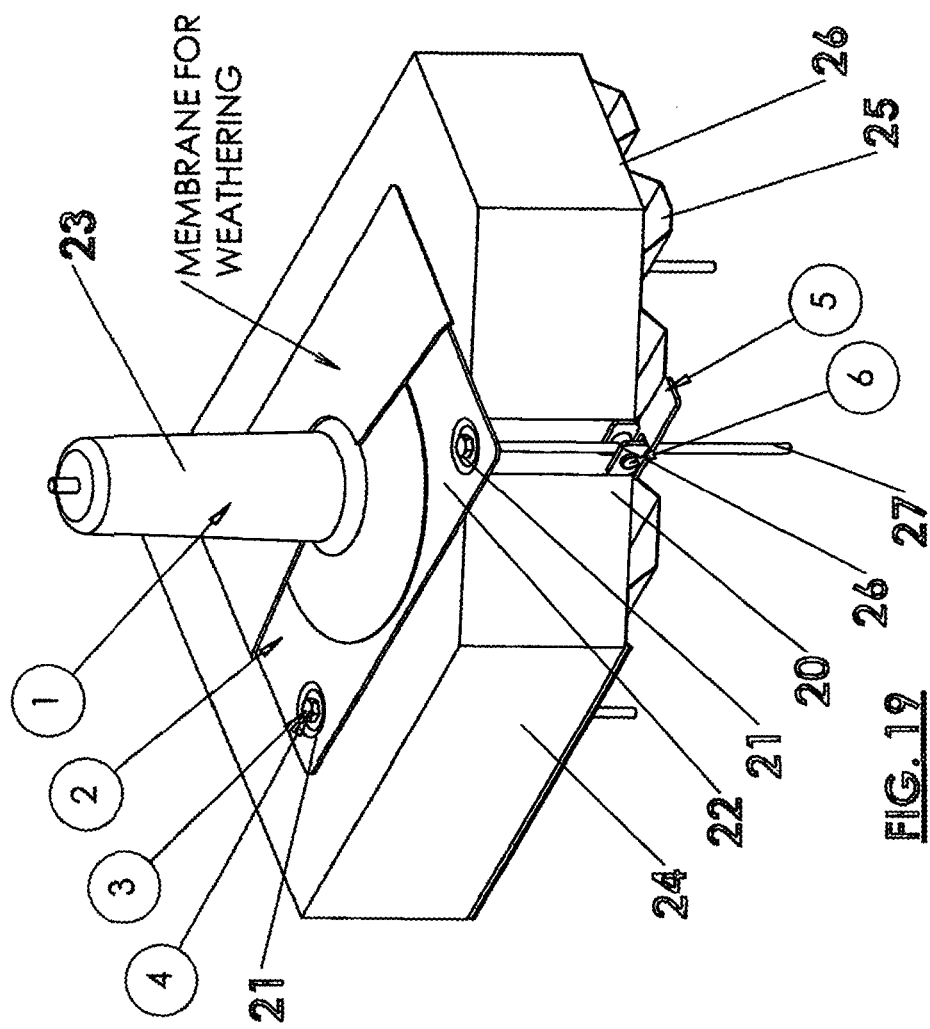
FIG. 19 is a perspective view of a roof installation comprising a toggle according to the present invention.
Figure 20:
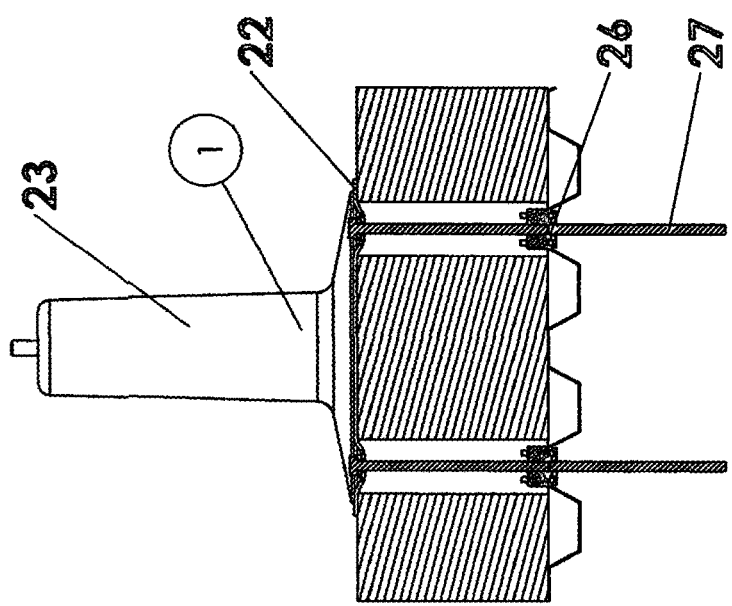
FIG. 20 is a sectional view of the installation of FIG. 19 in a plane containing the two rods 27 of FIG. 19.

Referring to FIG. 19, there is illustrated one of four toggles 20 in situ in a roof installation each to secure a respective corner 21 of a plate 22 and associated post 23 relative to the roof structure 24.

In this FIG. 19 the bearer plate of the toggle lies aligned with a longitudinally extending trough region 26 of a profiled metal roof panel 25.

However, in use the bearer plate may adopt a position in which it is inclined relative to the length of a trough region. In that case the pivotal freedom of the toggle allows the bearer plate to lie inclined at less than 90 degrees relative to the screw threaded rod 27.

The ability of the mild steel bearer plate to deform in sympathy with local deformation of the panel 25 when under load is most advantageous. That results in an ability to comply with safety standards even if the toggle lies inclined to bear against both of adjacent ridge and trough regions of the roof panel or to span two ridge regions.

This contrasts distinctly and most surprisingly with a toggle formed from a more rigid and potentially stronger material such as stainless steel. It has been found that the relative stiffness of the bearer plate of a stainless steel toggle is likely to puncture a metal roof section thereby to unacceptably damage and compromise the integrity of the roof structure. It is by the use of mild steel that that problem is overcome.

The invention claimed is:

1. A toggle, comprising:
   a barrel;
   a bearer plate which defines a contact surface for bearing, in use, against a confronting surface of a support structure; and
   a pair of support plates that are secured to the bearer plate, said support plates spaced apart from one another to pivotally support said barrel between said support plates, each one of said support plates extending from said contact surface of the bearer plate,
   said barrel being integral with or connectable to a connector,
   the connector configured such that, in use, the connector secures the bearer plate against the confronting surface of a support structure,
   at least the bearer plate being formed of steel, and each support plate of said support plates comprising a weld that secures the support plate to the bearer plate, and
   wherein each one of said support plates has a shorter length than the bearer plate in a direction perpendicular to an axis of rotation about which the barrel is pivotally supported relative to the support plates.

2. The toggle according to claim 1, wherein the barrel support plates are formed of steel.

3. The toggle according to claim 1, wherein the toggle complies with the safety standard EN 795 Type C.

4. The toggle according to claim 1, wherein the barrel is formed of steel.

5. The toggle according to claim 1, wherein the bearer plate has a thickness in the range 3 mm to 5 mm.

6. The toggle according to claim 1, wherein each barrel support plate has a thickness in the range 3 mm to 5 mm.

7. The toggle according to claim 1, wherein each support plate comprises a tongue portion which locates in a respective one of a pair of slots in the bearer plate.

8. The toggle according to claim 1, wherein each support plate is positioned inwards from an edge of the bearer plate.

9. The toggle according to claim 8, wherein each support plate is set 2 mm inwards from an edge of the bearer plate.

10. The toggle according claim 1, wherein the connector is a rod, and the barrel is provided with an aperture that receives the connector.

11. The toggle according to claim 10, wherein the connector rod is screw threaded, and said aperture is screw threaded to receive the screw threaded connector rod.

12. The toggle according to claim 10, wherein a longitudinal axis of the aperture intersects the axis of rotation of the barrel.

13. The toggle according to claim 1, wherein the bearer plate comprises a slot positioned between the barrel support plates to define an opening through which an end of the connector may extend.

14. The toggle according to claim 13, wherein the slot is a central slot.

15. The toggle according to claim 13, wherein the slot is an elongate shaped slot and regions of the slot each lie inwards of end regions of the bearer plate and whereby the slot has a continuous boundary defined by the bearer plate.

16. The toggle according to claim 1, wherein the connector is an elongate connector member integral with said barrel.

17. The toggle according to claim 1, wherein the connector retains the barrel in engagement with each support plate.

18. An assembly, comprising a toggle according to claim 1 and a support structure, wherein the connector extends through an aperture defined by the support structure and secures the contact surface of the bearer plate against a confronting surface of the support structure, said support plates extending into said aperture.

19. The assembly according to claim 18, and wherein the assembly complies with requirements of safety standard EN 795 Type C.

20. A toggle, comprising:
a barrel;
a bearer plate which defines a surface for bearing, in use, against a confronting surface of a support structure; and
a pair of support plates that are secured to the bearer plate, said support plates spaced apart from one another to pivotally support said barrel between said support plates,
said barrel being integral with or connectable to a connector,
the connector configured such that, in use, the connector secures the bearer plate against the confronting surface of the support structure,
wherein at least the bearer plate is formed of steel,
wherein each support plate of said support plates comprises a weld that secures the support plate to the bearer plate,
wherein the bearer plate comprises a slot, positioned between said support plates, that defines an opening through which an end of the connector may extend, and
wherein end regions of the slot each lie inwards of end regions of the bearer plate whereby the slot has a continuous boundary defined by the bearer plate.

21. An assembly, comprising:
a support structure; and
a toggle configured to be secured to the support structure, said toggle comprising:
a barrel;
a bearer plate which defines a contact surface for bearing against a confronting surface of the support structure; and
a pair of support plates that are secured to the bearer plate, said support plates spaced apart from one another to pivotally support said barrel between said support plates, each one of said support plates extending from said contact surface of the bearer plate,
said barrel being integral with or connected to a connector,
the connector configured such that, in use, the connector is able to secure the contact surface of the bearer plate against the confronting surface of the support structure,
at least the bearer plate of the toggle being formed of steel, and each support plate of said support plates comprising a weld that secures the support plate to the bearer plate,
wherein the support structure defines an aperture and the connector is configured to extend through the aperture defined by the support structure to secure the bearer plate against the confronting surface of the support member, and
wherein the support plates are configured so as to be located inside the aperture of the support structure when the bearer plate is secured against the support structure.

* * * * *